INFORMATION RECORDING CIRCUIT

Filed March 21, 1963 2 Sheets-Sheet 1

INVENTORS C. F. AULT
D. FRIEDMAN
BY Kenneth B. Hamlin
ATTORNEY

United States Patent Office 3,274,610
Patented Sept. 20, 1966

3,274,610

INFORMATION RECORDING CIRCUIT

Cyrus F. Ault, Lincroft, and David Friedman, Red Bank, N.J., assignors to Bell Telephone Laboratories, Incorporated, New York, N.Y., a corporation of New York Filed Mar. 21, 1963, Ser. No. 266,959
11 Claims. (Cl. 346—74)

Figure 1:
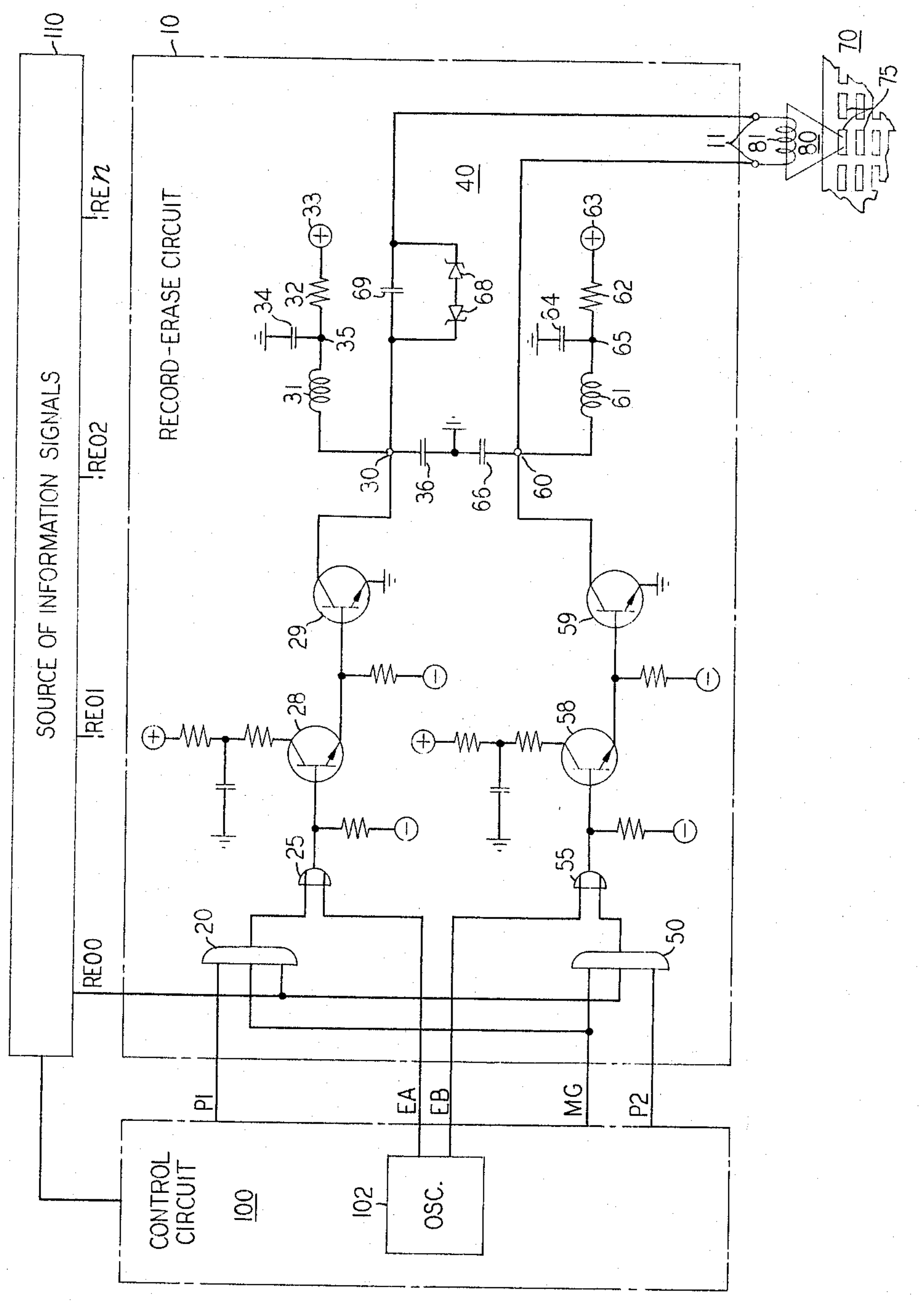

This invention relates to information storage systems and more particularly to magnetic recording circuits for selectively magnetizing and demagnetizing discrete portions of a magnetic storage medium.

Various circuit arrangements utilizing magnetic storage mediums have found widespread application, particularly in the information handling and data processing art. Magnetic storage mediums are capable of storing large quantities of information in discrete surface portions often referred to as storage cells, each cell storing a unit of information such as a binary bit. For example, a bit of information of one binary character may be represented by a storage cell in a magnetized condition, and a bit of information of the other binary character may be represented by a storage cell in a nonmagnetized condition. Information is stored on the magnetic medium, therefore, by selectively magnetizing the storage cells in accordance with the binary bits of information to be stored therein.

If the surface of the magnetic medium is initially in a nonmagnetized condition, storage of information is readily effected through the selective energization of a magnetizing, or record, transducer moving adjacent a channel or column of storage cells. Energization of the transducer places the adjacent storage cell in a magnetized condition to store a bit of information of the one binary character. Similarly, if the surface of the magnetic medium is initially in a magnetized condition, information storage is readily effected by selectively energizing a demagnetizing, or erase, transducer moving adjacent a channel of storage cells. However, where the surface of the medium comprises both magnetized and nonmagnetized storage cells, the storage of information is less readily effected. This condition may occur, for example, where a pattern of information is already stored on the medium and it is desired to change all or part of the prior information. In those instances where it is desired to replace only a small part of the prior information with new information, it is usually not practicable to first bulk treat the entire surface of the magnetic medium to place it in a magnetized or nonmagnetized condition. Rather, it is desirable to erase and record information only in those storage cells in which the prior information is to be replaced. Further, it is desirable to erase and to record information in the various storage cells during a single pass thereof.

This is partially accomplished in known information storage arrangements by providing separate erasing and recording circuitry, an erase transducer moving adjacent a channel of storage cells ahead of a record transducer. As the erase transducer passes adjacent a storage cell in which new information is to be stored, it is energized to erase the prior information stored therein. Thereafter the record transducer passes adjacent the same storage cell and is controlled to effect the storage of new information therein. The use of separate recording and erasing circuitry, however, undesirably increases the cost, circuit complexity and bulk of the information storage arrangement, and limits the over-all speed of the information recording operation.

Accordingly, it is a general object of this invention to provide a simple, compact and economical information recording circuit.

More particularly, it is an object of this invention to provide a simple, compact and economical information recording circuit for selectively magnetizing and for selectively demagnetizing discrete portions of a magnetic storage medium.

It is a further object of this invention to provide a circuit for erasing mangetically recorded information from discrete portions of a storage medium, which circuit may also be employed advantageously to magnetically record information on discrete portions of the storage medium and to selectively control the polarity of magnetization.

Another object of this invention is to provide a circuit for generating an output signal for demagnetizing discrete portions of magnetic material and for selectively modifying the output signal for magnetizing discrete portions of magnetic material.

The storage cells of a magnetic medium are usually arranged in a plurality of parallel channels or columns. When a magnetizing field is applied to a storage cell in one channel, a portion thereof may infringe upon storage cells in immediately adjacent channels. If a similar magnetizing field is applied to these adjacent storage cells, no problem arises. When, however, a demagnetizing field is concurrently applied to an adjacent storage cell the interaction of the two fields tends to degrade the magnetization of the one storage cell. Further, the interaction of the two fields tends to an even greater extent to degrade the demagnetization of the adjacent storage cell, thus leaving it with a residual level of magnetization. Accurate readout of the stored information can be readily accomplished only when sufficient margin is maintained between the levels of magnetization of the magnetized and the nonmagnetized storage cells.

The importance of maintaining sufficient magnetization level margins between magnetized and nonmagnetized storage cells, and more particularly the importance of demagnetizing a nonmagnetized storage cell to a very low level of residual magnetization, increases considerably in information storage systems of the permanent magnet, card changeable type such as disclosed, for example, in S. M. Shackell application, Serial No. 708,127, filed January 10, 1958. Therein, information is stored through the use of removable cards having a plurality of small bar magnets bonded or deposited thereon. The cards are situated in the memory such that each bar magnet is in the proximity of a respective magnetic crosspoint element. If a bar magnet is in a magnetized condition the respective memory crosspoint element is thus biased by the static magnetic field of the magnet. When an interrogation signal is applied to a memory crosspoint in the absence of a static magnetic field, an output signal is generated representative of a bit of one binary character. The presence of a static magnetic field due to a bar magnet, however, inhibits generation of an output signal from a crosspoint, which is representative of a bit of the other binary character.

Clearly, therefore, the level of magnetization of a magnet in a magnetized condition and the level of magnetization of a magnet in a nonmagnetized condition must be sufficiently distinct from one another to permit accurate discrimination during interrogation. Moreover, it is desirable that the residual magnetization level of a magnet in a nonmagnetized condition be as low as possible to preclude there being sufficient static magnetic field therefrom to erroneously inhibit the generation of an output signal during interrogation.

It is accordingly a further object of this invention to provide circuitry for demagnetizing a storage cell on a magnetic medium and for concurrently magnetizing an immediately adjacent storage cell, which circuitry minimizes the interaction effects of adjacent magnetizing and demagnetizing fields.

A still further object of this invention is to provide a circuit for selectively demagnetizing individual storage cells of a magnetic medium to a lower level of residual magnetization than heretofore possible during continuous relative movement between a transducer and the magnetic medium.

Another object of this invention is to provide recording circuitry advantageously suited for selectively magnetizing and demagnetizing discrete storage cells of the bar magnet type.

It is a more specific object of this invention to provide circuitry for selectively magnetizing or demagnetizing discrete bar magnets during continuous relative movement between a transducer and the magnets.

In accordance with a specific embodiment of our invention the above and other objects are attained through circuitry employing an electromagnetic transducer having a single winding energized by a common circuit selectively for recording information on a magnetic medium or for erasing information previously recorded on the magnetic medium. The terminals of the transducer winding are connected to ground through individual capacitors to form a series resonant ringing circuit. Energy is supplied to the ringing circuit to initially charge both capacitors to a reference potential. Both recording and erasing operations are similarly initiated by pulsing the two ringing capacitors alternately and successively to ground at the resonant frequency of the ringing circuit, causing alternating current to flow in the transducer winding. Concurrently, energy is supplied to the ringing circuit to increase the magnitude of the alternating current quickly to a first level sufficient to magnetically control the switching of a storage cell adjacent the transducer.

If the storage cell is to be demagnetized, alternate pulsing of the two capacitors to ground continues at the resonant frequency of the ringing circuit, and the magnitude of the alternating current in the transducer winding is decreased to a second level sufficient to maintain magnetic control of the storage cell. The current in the winding is maintained at this level until the transducer is no longer adjacent the storage cell, thereby minimizing the level of any residual magnetization left on the storage cell. Thereafter, the alternate grounding of the capacitors is discontinued and the capacitors are recharged to the reference potential before the transducer is placed adjacent a successive storage cell. The level of any residual magnetization left on the storage cell is further minimized through the connection of a direct-current blocking capacitor in circuit with the transducer winding.

If a storage cell adjacent the transducer is to be magnetized, circuit operation is the same as above until the magnitude of the alternating current in the transducer winding reaches the first level. At this point, during a voltage maximum on one of the capacitors being pulsed, the other capacitor is clamped to ground and held there, the consequent discharge of the one capacitor generating a large current spike of sufficient magnitude to saturate the storage cell situated adjacent the transducer. The clamp to ground provides a direct-current path through the transducer winding, bypassing the blocking capacitor via a breakdown circuit, illustratively a pair of back-to-back Zener diodes connected in shunt with the blocking capacitor. The ground clamp remains on the one capacitor until the transducer is no longer adjacent the storage cell, thereby minimizing any degradation of the level of magnetization of the storage cell.

The effects of interaction between a magnetizing field being applied to one storage cell and a demagnetizing field being applied to an adjacent storage cell, are therefore, advantageously minimized through the use of circuitry in accordance with the principles of our invention. Both magnetizing and demagnetizing fields reach their maximum intensity at substantially the same time; thereafter the magnetizing field decreases rapidly to a level which is sufficiently low to minimize interaction with the demagnetizing of adjacent storage cells. The bias provided by the breakdown circuit prevents current excursions of the opposite polarity in a transducer adjacent a magnetized storage cell, thereby preventing degradation of the magnetization level thereof by adjacent demagnetizing fields. Thus, until the transducers pass from the proximity of their respective storage cells, those transducers adjacent magnetized storage cells remain clamped to ground, while those transducers adjacent storage cells being demagnetized continue to be driven by alternating current at a decreased level.

It is, therefore, a feature of this invention that a magnetic recording circuit comprise circuitry for alternately pulsing a pair of capacitors interconnected through a transducer winding and for concurrently supplying energy to the capacitors such that alternating current is generated in the transducer winding which initially increases to a magnitude sufficient to control the switching of a magnetic storage cell and which thereafter decreases to a magnitude sufficient to maintain control until the transducer is no longer adjacent the storage cell.

It is another feature of this invention that a magnetic recording circuit comprise circuitry for alternately pulsing a pair of capacitors interconnected through a transducer winding, circuitry for concurrently supplying energy to the capacitors, and circuitry for selectively clamping one of the capacitors to ground coincident with the pulsing thereof to generate a direct-current signal in the transducer winding.

A further feature of this invention is that a magnetic recording circuit for selectively magnetizing and demagnetizing discrete storage cells comprise a direct-current blocking element in circuit with a transducer winding and direct-current breakdown circuitry in shunt with the blocking element.

Figure 2:
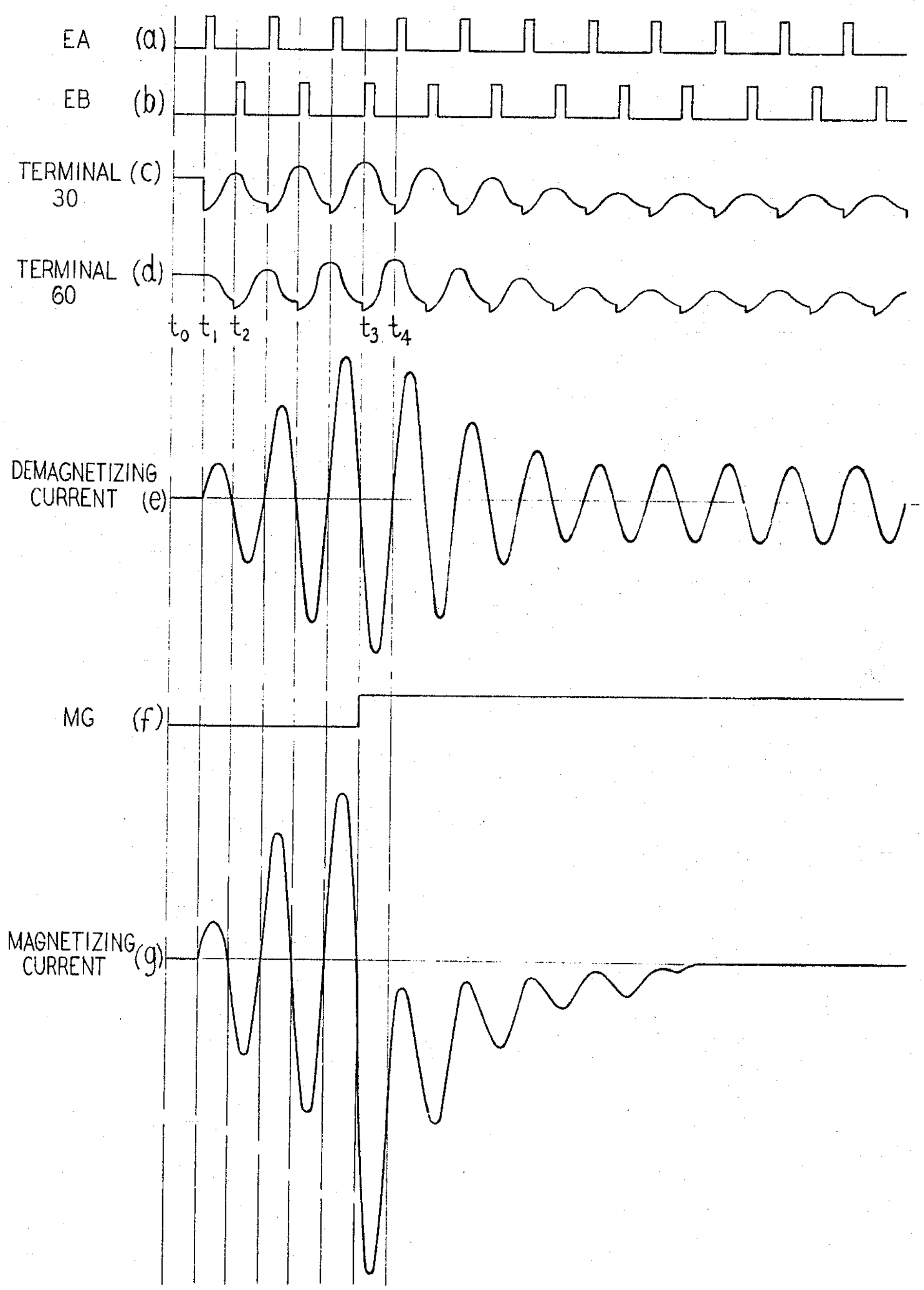

The above and other objects and features of the present invention may be better understood upon consideration of the following detailed description and the accompanying drawing in which:

FIG. 1 is an illustrative embodiment of an information recording circuit in accordance with the principles of our invention; and FIG. 2 is a time chart indicating the operation of the illustrative embodiment of FIG. 1.

Referring more particularly now to FIG. 1 of the drawing, a magnetic storage medium 70 is shown comprising a plurality of discrete magnetic storage cells 75, each storage cell 75 being capable of storing a unit of information such as a binary bit. For the purposes of this description it will be assumed that a storage cell 75 is magnetized to store a bit of one binary character and that a storage cell 75 is demagnetized to store a bit of the other binary character. Relative motion is imparted between storage medium 70 and transducer 80 situated adjacent thereto, and a storage cell 75 passing adjacent transducer 80 is magnetized or demagnetized in accordance with the signal applied to energization winding 81 of transducer 80. Although only one transducer 80 is shown in FIG. 1 for purposes of clarity, it will be apparent that a plurality of such transducers may be employed for parallel information storage, each transducer being situated adjacent a respective channel or column of storage cells 75.

The terminals of winding 81 of each transducer 80 are connected to output terminals 11 of an individual record-erase circuit 10. Input signals are provided to record-erase circuit 10 on leads P1, P2, EA, EB, and MG from control circuit 100 and on lead RE00 from source of information signals 110. Source of information signals 110 may include any source presenting information signals to be recorded in storage cells 75, and may provide such signals in parallel on leads RE00 and RE01 through **RE*n* for parallel recordation in a row of storage cells 75. Control circuit 100 comprises an oscillator 102 for providing successive signals at a predetermined frequency alternately on leads EA and EB to record-erase circuit 10. Control circuit 100** further comprises circuitry for providing signals on leads P1, P2 and MG as described below, which circuitry may be of the type shown, for example, in C. F. Ault-D. Friedman-R. H. Granger-J. J. Madden application Serial No. 266,962, filed March 21, 1963.

Record-erase circuit 10 in accordance with the principles of our invention is shown comprising a pair of capacitors 36 and 66 respectively connected between terminals 11 and ground to form ringing circuit 40 with energization winding 81 of transducer 80. Capacitor 69 is connected in circuit with winding 81 and the ungrounded terminal 30 of capacitor 36, and a pair of back-to-back breakdown diodes 68 are connected across capacitor 69. Terminal 30 is connected through inductor 31, point 35, and resistor 32 to source of potential 33. Capacitor 34 is connected between point 35 and ground. A similar circuit arrangement is connected to ungrounded terminal 60 of capacitor 66, comprising inductor 61, resistor 62, source 63 and capacitor 64.

Leads P1 and MG from control circuit 100 and lead RE00 from source of information signals 110 are connected to the inputs of AND-gate 20, the output of which is connected to an input or OR-gate 25. Another input or OR-gate 25 is connected to lead EA. Leads MG and RE00 are also connected, along with lead P2, to the inputs of AND-gate 50, the output of which is connected to an input of OR-gate 55. Lead EB is also connected to an input of OR-gate 55. The outputs of OR-gates 25 and 55 are connected through individual amplifier circuits to terminals 30 and 60 respectively. Thus, the output of OR-gate 25 is connected to an amplifier circuit comprising transistors 28 and 29, the collector of transistor 29 being connected to terminal 30 and the emitter thereof being connected to ground. Similarly, the output of OR-gate 55 is connected to an amplifier circuit comprising transistors 58 and 59. The collector or transistor 59 is connected to terminal 60 and the emitter thereof is connected to ground.

For information storage purposes, as mentioned above, relative motion is imparted between transducer 80 and storage medium 70. During the time transducer 80 is adjacent a storage cell 75 of storage medium 70, information is stored therein in accordance with the signal provided to winding 81 of transducer 80. For example, let it be assumed that transducer 80 is adjacent a storage cell 75 which it is desired to place in a nonmagnetized condition. Oscillator 102 is energized by control circuit 100 to provide a train of successive pulses alternately on leads EA and EB to record-erase circuit 10 at substantially the resonant frequency of ringing circuit 40, as illustrated in FIGS. 2(*a*) and 2(*b*). The pulses on leads EA and EB are applied to record-erase circuit 10 by oscillator 102 during the time transducer 80 and the particular storage cell 75 being demagnetized are adjacent each other.

The pulses appearing on lead EA are directed through OR-gate 25 to the base of transistor 28, which is normally in a high impedance, nonconducting state. During each of the pulses on lead EA, transistor 28 is switched to a low impedance conducting state to drive transistor 29. Transistor 29 functions as a normally-open switch connected in parallel with capacitor 36, which is thus closed during each pulse on lead EA to ground terminal 30 of capacitor 36. Similarly, transistor 59 functions as a normally-open switch connected across capacitor 66 which is closed during each pulse on lead EB to ground terminal 60 of capacitor 66. The pulses appearing alternately on leads EA and EB, therefore, extend ground alternately through transistors 29 and 59 to terminals 30 and 60, respectively.

Initially, before a pulse appears on either of leads EA and EB, capacitors 34 and 36 are charged to a reference potential determined by source 33; and capacitors 64 and 66 are charged to the same reference potential by source 63. At time $t_0$, therefore, this reference potential appears at terminals 30 and 60, as illustrated in FIGS. 2(*c*) and 2(*d*), respectively. Assume now that the first pulse from oscillator 102 appears on lead EA, as shown at time $t_1$, in FIG. 2(*a*). Transistor 29 is switched to a low impedance state, connecting terminal 30 to ground and quickly discharging capacitor 36, as illustrated in FIG. 2(*c*). Capacitor 66 begins to discharge in ringing circuit 40, causing current to flow through transducer winding 81, capacitor 69 and point 30 to ground. Inductors 31 and 61 effectively isolate capacitors 34 and 64, respectively from the pulsing to ground of terminals 30 and 60.

Upon cessation of the pulse on lead EA, which is considerably shorter in duration than one-half the period of resonant circuit 40, transistor 29 returns to its high impedance state. Terminal 30 rises in potential as capacitor 36 charges from the current flow through winding 81. Capacitor 36 thus charges towards a level determined by the initial energy in ringing circuit 40 and by the additional energy being added thereto from the slow discharge of capacitors 34 and 64, and capacitor 66 discharges toward a minimum level principally determined by the parameters of ringing circuit 40. When these levels are reached at time $t_2$, current flow in transducer winding 81 reverses, capacitor 36 discharging therethrough toward capacitor 66. At the same time, time $t_2$, the first pulse appears on lead EB as show in FIG. 2(*b*). Transistor 59 is switched thereby to a low impedance state, pulsing terminal 60 to ground and discharging capacitor 66, as illustrated in FIG. 2(*d*).

The alternate charge and discharge of capacitors 36 and 66 continues at the resonant frequency of ringing circuit 40, terminals 30 and 60 being alternately pulsed to ground in synchronism therewith by the signals appearing on leads EA and EB. The energy in ringing circuit 40, and thus the magnitude of the current flowing in winding 81, continues to increase as capacitors 34 and 64 discharge into terminals 30 and 60, respectively. A graphical representation of the demagnetizing current thus generated in winding 81 is illustrated in FIG. 2(*e*). After several cycles an equilibrium is reached between the energy in ringing circuit 40 and the energy remaining in the circuits including capacitors 34 and 64. This equilibrium level is chosen to be sufficiently large to assure that transducer 80 has gained control of the magnetic switching of the storage cell adjacent thereto. Thereafter, the magnitude of the alternating current flowing in winding 81 decreases to a level determined principally by sources 33 and 63 and by resistors 32 and 62. This level of alternating current is sufficient to permit transducer 81 to maintain control of the storage cell until transducer 81 passes from the proximity thereof. This minimizes the effect on the storage cell of any adjacent magnetizing fields. The degrading effect of any circuit unbalances in circuit 10 which might produce a direct-current component in transducer winding 81 is minimized by blocking capacitor 69.

Upon transducer 81 passing from the proximity of the storage cell being demagnetized, control circuit 100 deenergizes oscillator 102, resulting in cessation of the pulses on leads EA and EB. Both transistors 29 and 59 are thus returned to their normal nonconducting state, and capacitors 34, 36, 64 and 66 recharge to their reference potentials before transducer 80 passes adjacent a successive storage cell 75.

Now let it be assumed that transducer 80 is adjacent a storage cell 75 which it is desired to place in a magnetized condition, as indicated by an information signal on lead RE00 from source of information signal 110. A signal appears on one of leads P1 and P2 from control circuit 100 to indicate the desired polarity of magnetization to be applied to storage cell 75. For purposes of illustration, assume that the signal appears on lead P2 to AND-gate 50. The AND-gate 50 is not, however, enabled until a signal appears on lead MG from control circuit 100 as described below.

Initially, then, oscillator 102 is energized in the same manner as for demagnetization of a storage cell, providing pulses alternately on leads EA and EB to record-erase circuit 10. The pulses appearing on leads EA and EB, therefore, extend ground alternately through transistors 29 and 59 to terminals 30 and 60, respectively. The potential at terminals 30 and 60 thus varies for the first several cycles in the manner shown in FIGS. 2(*c*) and 2(*d*), the alternating current through transducer winding 81 increasing in magnitude due to the energy added to ringing circuit 40 by capacitors 34 and 64. At time $t_3$ a pulse appears on lead EB, the normal function of which is to pulse terminal 60 to ground. However, coincident with the pulse on lead EB at time $t_3$, control circuit 100 applies a signal on lead MG to enable AND-gate 50, as illustrated in FIG. 2(*f*). The AND-gate 50 remains enabled by the inputs on leads RE00, MG and P2 until transducer 80 has passed from the proximity of storage cell 75 being magnetized.

The output of enabled AND-gate 50 is applied through OR-gate 55 to the base of transistor 58, thereby holding transistor 58 in its low impedance state which in turn holds transistor 59 in its low impedance state. Terminal 60 is thus extended to ground through transistor 59 at time $t_3$, and remains clamped to ground during the remainder of the time transducer 80 is adjacent the storage cell 75 being magnetized. Therefore, instead of being pulsed to ground, terminal 60 is clamped to ground through transistor 59 at time $t_3$. Capacitor 66 being thus removed from ringing circuit 40, capacitor 36 now discharges in a large current spike through winding 81. The magnetic field thus generated by transducer 80 saturates adjacent storage cell 75 placing it in the desired magnetized condition.

Since terminal 60 remains clamped to ground, a direct-current path is established from capacitor 34 through inductor 31, diodes 68, winding 81 and transistor 59 to ground. The continued pulsing to ground of terminal 30 by the pulses appearing on lead EA has no degrading effect on the magnetized storage cell since the alternating-current component is biased in the direction of magnetization. Further, the direct-current bias provided by source 33 and the discharge of capacitor 34 minimizes the degrading effect of any alternating current induced in transducer winding 81 from other sources such as adjacent transducers. Conversely, since the large magnetizing current spike ceases before the demagnetizing current being applied to the other transducers, as illustrated in FIGS. 2(*e*) and 2(*g*), degradation of the demagnetized condition of storage cells adjacent the other transducers is minimized.

In the above description, it was assumed that lead P2 was energized by control circuit 100. Clearly, if the opposite polarity of magnetization is desired, lead P1 is energized by control circuit 100 to enable AND-gate 20 upon the appearance of a signal on lead MG. The signal on lead MG is then provided by control circuit 100, coincident with the appearance of a pulse on lead EA, at a point in time when the energy in ringing circuit 40 has increased above some predetermined magnitude, such as at time $t_4$ in FIG. 2.

It is to be understood that the above-described arrangements are merely illustrative of the application of the principles of the invention. Numerous other arrangements may be devised by those skilled in the art without departing from the spirit and scope of this invention.

What is claimed is:

1. A magnetic recording circuit for demagnetizing discrete portions of a magnetic medium comprising a transducer having a winding, a pair of capacitors each having two terminals, means connecting a first terminal of each of said capacitors to ground potential, means interconnecting the second terminal of each of said capacitors through said winding to form a series resonant circuit, means for initially charging both of said capacitors, means for alternately pulsing said second terminals to ground at a frequency substantially equal to the resonant frequency of said series resonant circuit, discharge circuit means for supplying energy to said second terminals during the operation of said pulsing means, and direct-current blocking means in circuit with said transducer winding and said second terminals.

2. A magnetic recording circuit in accordance with claim 1 further comprising means for selectively magnetizing discrete portions of a magnetic medium including means for selectively clamping one of said second terminals to ground potential coincident with the pulsing thereof by said pulsing means, and means for selectively providing a direct-current path in shunt with said blocking means.

3. A magnetic recording circuit in accordance with claim 2 wherein said last-mentioned means comprises breakdown circuit means connected in shunt with said blocking means.

4. A magnetic recording circuit for selectively magnetizing and demagnetizing discrete portions of a magnetic medium, comprising a transducer having a single winding, means for applying alternating current to said winding, means selectively operable for providing a direct-current signal to said winding coincident with a current peak of said alternating current and for thereafter damping said alternating current quickly to a quiescent level, blocking means in circuit with said transducer winding for normally preventing the flow of direct current in said transducer winding, and means in shunt with said blocking means for providing a path for said direct-current signal.

5. A magnetic recording circuit for selectively magnetizing and demagnetizing discrete portions of a magnetic medium, comprising a transducer having an energization winding, a series resonant circuit including said transducer winding and a pair of capacitors interconnected through said winding, means for initially storing energy on said capacitors, pulsing means for alternately discharging each of said pair of capacitors at a frequency substantially equal to the natural frequency of said series resonant circuit, reactive circuit means for supplying energy to said series resonant circuit during the operation of said pulsing means, and magnetization signal means selectively operable for clamping one of said pair of capacitors to ground potential coincident with the discharge of said one capacitor by said pulsing means.

6. A magnetic recording circuit comprising a transducer having a winding, a pair of capacitors each having two terminals, means connecting a first terminal of each of said capacitors to ground potential, means interconnecting a second terminal of each of said capacitors through said transducer winding, means connected to said second terminals for initially charging said capacitors to a first potential, means for alternately pulsing said second capacitor terminals to ground potential at a predetermined frequency, reactive circuit means connected to said second terminals for supplying energy to said capacitors, and means selectively operable for clamping one of said capacitors to ground potential coincident with the pulsing thereof to ground potential by said pulsing means.

7. A magnetic recording circuit in accordance with claim 6 wherein said reactive circuit means comprises a capacitive discharge circuit and means for isolating said capacitive discharge circuit from the pulsing of said second terminals to ground potential.

8. A magnetic recording circuit comprising a transducer winding, a pair of capacitors interconnected through said transducer winding, means for supplying energy to said capacitors, means for alternately pulsing said capacitors to ground to generate an alternating current in said transducer winding, and means selectively operable for clamping one of said capacitors to ground coincident with the pulsing thereof to generate a direct-current signal in said transducer winding.

9. A magnetic recording circuit in accordance with claim 8 further comprising direct-current blocking means in circuit with said transducer winding, and direct-current breakdown means connected in parallel with said blocking means and responsive to said direct-current signal.

10. A magnetic recording circuit for selectively magnetizing and demagnetizing discrete portions of a magnetic medium, comprising a transducer having a single winding; demagnetizing current means including means for applying an alternating current to said winding, and means for controlling the magnitude of said alternating current to increase initially above a first predetermined magnitude and to thereafter decrease to a second predetermined magnitude; and magnetizing current means selectively operable for providing a direct-current signal coincident with a like polarity current peak of said alternating current of magnitude greater than said first predetermined magnitude, and means for thereafter damping said alternating current to a quiescent level.

11. A magnetic recording circuit in accordance with claim 10 wherein said demagnetizing current means further comprises direct-current blocking means connected in circuit with said winding and said magnetizing current means further comprises means connected in shunt with said blocking means for providing a path for said direct-current signal.

References Cited by the Examiner

UNITED STATES PATENTS

| | | | |
|---|---|---|---|
| 2,922,144 | 1/1960 | White et al. | 340—174.1 |
| 3,038,036 | 6/1962 | Young et al. | 179—100.2 |

BERNARD KONICK, *Primary Examiner.*

A. L. BERNARD, *Assistant Examiner.*